Jan. 16, 1962    JEAN-CLAUDE ROUCAYROL ET AL    3,017,510
MEASUREMENT OF RADIOACTIVITY EMITTING COMPOUNDS
Filed June 16, 1958
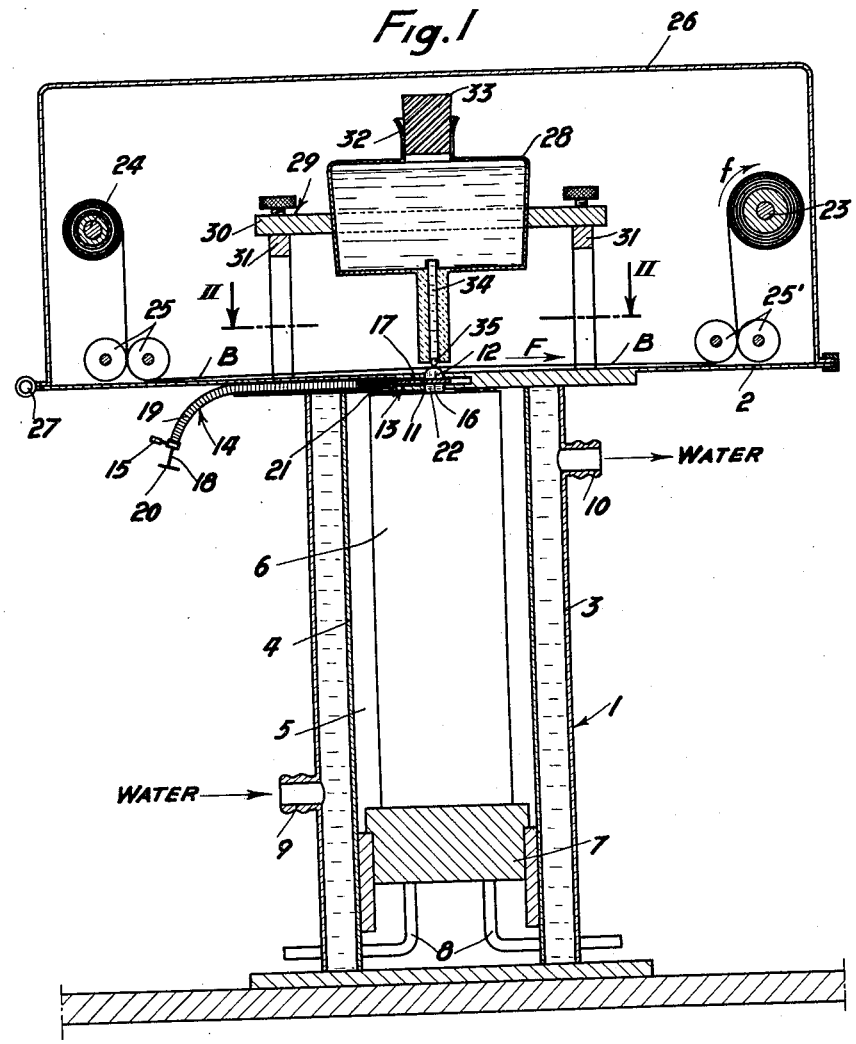
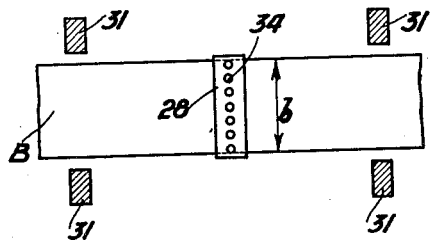
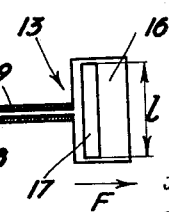
JEAN CLAUDE ROUCAYROL,
ERICH OBERHAUSEN and
RICHARD SCHUSSLER
BY: Allen & Allen
ATTORNEYS

United States Patent Office 3,017,510
Patented Jan. 16, 1962

3,017,510
MEASUREMENT OF RADIOACTIVITY EMITTING COMPOUNDS
Jean-Claude Roucayrol, Paris, France, and Erich Oberhausen, Frankfurt am Main, and Richard Schussler, Volklingen, Germany, assignors to Centre National de la Recherche Scientifique, Paris, France, a corporation of France
Filed June 16, 1958, Ser. No. 742,318
Claims priority, application France June 28, 1957
5 Claims. (Cl. 250—71.5)

Various devices are known for determining the radio-activity of preparations which emit ionising radiations, such as $\alpha, \beta$ and $\gamma$ rays, by means of scintillations produced in a liquid scintillator which contains in solution the substance which emits such radiations.

Liquid scintillators are substances capable of emitting, under the action of particular or electro-magnetic radiations of high frequencies, radiations of lower frequencies to which the photomultipliers commercially available are sensitive.

The use of emitters dissolved in liquid scintillators, such as phenyl-hiphenyl-oxadiazole in toluene, gives excellent results, even for emitters of soft $\beta$ rays which supply a small number of photons at each scintillation, when use is made of a photo-multiplier having a small residual current (in the absence of a radio-active sample) and a device held at constant temperature and provided with an excellent optical coupling, for example of the type described in our co-pending application, Serial No. 571,966, filed on March 16th, 1950 in the names of the first two applicants of the present application.

It is however not always possible or advantageous to operate on emitting samples dissolved in a liquid scintillator. It is in fact often convenient to utilise filter-paper as a support for radio-active substances, and it is sometimes even essential for certain analytical processes (such as chromatography and electrophoresis) to make use of filter-paper.

In view of the fact that filter-paper absorbs a certain proportion of the radiations and that this proportion is very high in the case of soft $\beta$ rays, a very efficient measurement of the radio-activity of emitters, and in particular emitters of soft $\beta$ rays located in filter-paper, cannot be made.

Another method consists in immersing a folded support of filter-paper, metal or "Cellophane" in a container filled with a liquid scintillator, which is viewed by a photo-multiplier. This known method does not involve either reduction of the self-absorption of the radiation in the sample, or any definite improvement in the geometry or the fidelity of the measurements, such as are carried out with a counter without windows; it does not permit of continuous detection, and finally it necessitates a considerable volume of liquid scintillator.

The inventors have found that it is possible to determine, with a good sensitivity, the radio-activity of samples of emitting products on a filter-paper support. In addition, they have found that in certain analytical processes, for example in chromatography, when a band of filter-paper is used to support the radio-active products analysed, there is an advantage in scanning such a band in order to determine the variation of the radio-activity. In order to obtain these results, the inventors impregnate or soak the filter paper with a liquid scintillator, for example a solution of phenyl-biphenyl-oxadiazole in toluene, in such a manner that part of the energy of the particles, such as $\beta$ or alpha rays, which would normally be lost in the paper, gives rise to scintillations which are readily detectable by a photo-multiplier, by reason of the transparency given to the paper by the liquid scintillator.

In addition, there is often an advantage in fixing the radio-active products in the filter paper by means of a viscous solution of a polymer, for example a solution of methyl-polymethacrylate (designated by the trademark "Plexiglas").

The operation is carried out either on separate elements of the support, or on a continuous support, the elements of which are successively examined as they pass.

In consequence, the present invention has for its object a method of measuring the radio-activity of emitters which impregnate a support of filter paper, tissue paper or like product, the said method consisting in soaking a portion of the support with a liquid scintillator, and preferably in fixing this impregnated portion by means of a highly viscous liquid, and in bringing the said soaked and impregnated portion in front of a photo-multiplier.

In the case of a band of filter-paper impregnated with a radio-active substance which is to be continuously examined, the method consists in causing the said band to pass in front of means for soaking the band with a liquid scintillator and preferably with a solution of a high polymer ensuring the fixation of the radio-active substance, and in front of a photo-multiplier.

Because of the fact that the radio-activity is in the detecting medium, and that we use a very thin and translucent sample, and apply it against the photocathode, and set a reflector above the sample for the photons which are emitted upwards, we realize a geometry corresponding practically to a solid angle of $4\pi$ steradians with a very small quantity of scintillator. In the case of examination of separate samples, the volume of scintillator is of the order of a few hundredths of a cubic centimetre.

The invention has also for its object a device for the continuous measurement of alpha or beta, or alpha plus gamma, or beta plus gamma radioactivities in a band of filter paper impregnated with them characterised in that it comprises in combination: a frame having a housing; a photo-multiplier in the said housing; a plate on the frame and covering the housing, an orifice or slot being formed in the plate above the photo-multiplier; means for causing the said band to pass across the said orifice; means for applying to the said band, on the upstream side or on a level with the said orifice in the direction of travel of the band, a liquid scintillator, with preferably a high fixing polymer; and means for preventing any ambient light from reaching the active surface of the said photo-multiplier.

In the preferred form of embodiment, the device according to the invention comprises in combination: a hollow frame; means for circulating a fluid in the said hollow frame; a housing in the said frame; a photo-multiplier in the said housing; a plate on the said frame and covering the said housing, a slot of small width and having a length at least equal to the width of the bands (or the widest band) to be examined being formed in the said plate above the said photo-multiplier; a colosure member of a material such as a mineral or organic glass, transparent at the wave-lengths of the scintillations to be detected by the photo-multiplier, adapted to close the said slot; an opaque shutter, of the screen type for example, for closing the said slot at will; bobbins or rollers for causing the band to travel against the upper face of the closure member; a receptacle intended to receive a liquid composition comprising the scintillator and preferably dissolved methyl polymethacrylate, the said receptacle being provided at its lower part with a series of fine orifices substantially in line, in order to allow a sheet of liquid having substantially the length of the said slot, to flow; legs resting on the said plate and intended to carry the said receptacle in such manner that the series of fine orifices is located above the said closure member, at a distance from the band resting on the said member less than the length of one drop of the said liquid composition passing out of the said orifices; and a hood or cover covering the said rollers or bobbins, the receptacle and the legs, and resting on the said plate, means being provided for rendering light-tight the joint between the plate and the hood.

The preferred form of embodiment of the device in accordance with the invention will now be described in more detail, reference being made to the accompanying diagrammatic drawings, in which:

FIG. 1 is a vertical cross-section of the device;
FIG. 2 is a cross-section along the line II—II of FIG. 1;
FIG. 3 finally shows a plan view of the closure device of the slot.

The device for the continuous determination of the radio-activity of the supporting band B of filter-paper, carrying a substance which emits ionising radiations, shown in the drawings, comprises first of all a frame 1 with its plate 2. The frame 1 is hollow so as to permit of the circulation of a fluid, such as water between the outer wall 3 and the wall 4 of a cylindrical housing 5, in which is placed a photo-multiplier 6 with its socket 7 and its input and output leads 8. The water passes in for example at 9 and leaves at 10, and it is intended to secure the constancy of the temperature of the device during the course of measurement.

In the horizontal plate 2 is formed a slot or rectangular cut-out portion 11 closed at its upper part by a member 12 of a transparent material such as glass (natural or synthetic). In certain cases, it is possible to provide for the slot 11 to be closed by an opaque shutter 13 which can be operated by a flexible release 14 of the same type as that utilised for photographic apparatus, and preferably having a locking screw 15. The shutter 13 (see FIG. 3) may be constituted by a metal plate 16 in which is formed a rectangular slot 17, the length $l$ of which is at least equal to the width $b$ of the band B (see FIG. 2). This plate 16 is moved laterally in the direction of the arrow F by the rod 18 surrounded by the flexible sheath 19, when the button 20 of the release 14 is depressed. In this way, the slot 17 can be brought opposite the cut-out portion 11 and it can then be locked in this position by screwing up the locking screw 15.

A ring 21 is arranged between the photo-multiplier 6 and the plate 2 and the space 22 in the interior of the ring 21 is permanently filled with any transparent liquid known for optical couplings having a refractive index in the vicinity of that of the substance from which the member 12 is made. In the absence of the shutter 13, all the space under the member 12 is of course filled with the above mentioned liquid.

The device for moving the band B longitudinally comprises a receiving bobbin or reel 23, driven in rotation in the direction of the arrow $f$ by a spiral spring (not shown), a feeding reel 24, on which is wound the roll of the band B to be examined, and two pairs of rollers 25 and 25', so arranged that the band B comes to rest against the upper convex surface of the member 12, one of the pairs (for example 25) serving to drive the band B at constant speed by means of a motor (not shown), in front of the photo-multiplier 6, whilst the other pair 25' is freely rotatable.

The band-moving arrangement is housed under a removable cover 26 which may be mounted on hinges at 27 on the plate 2, preventing any external light from passing under the cover.

Under the cover 26 is also housed a receptacle 28 with its support 29, constituted for example by a cross-plate 30 pierced with a hole to receive the receptacle 28, and resting on four legs 31.

The receptacle 28 is intended to receive, through its neck 32 which can be closed by the stopper 33, a liquid composition containing a scintillator, and preferably an agent for fixing radio-active products. In the stopper 33 a long hollow needle is inserted to let air penetrate to the bottom of the receptacle 28 in a known manner. This receptacle terminates at its lower portion in a series of capillary tubes 34 which allow the liquid composition contained in the receptacle 28 to flow on the band B on the upstream side of the member 12 or, as shown, exactly at the level of the member 12. The upper extremities of the tube 34 pass beyond the bottom of the receptacle 28, which thus prevents any possible sediment of the liquid composition from interfering with the flow of the liquid. It is an advantage that the drops 35 which are still retained by capillarity in the tubes 34 reach the band B and are carried away by the travelling movement of the band; by this means, the flow and the delivery of the liquid composition are determined by the speed of travel of the paper.

The operation of the device according to the invention is as follows:

The receptacle 28 is filled with a composition containing a scintillator and preferably a fixing agent for fixing radio-active products on the band.

The roll of filter paper is placed on the reel 24 and the end of the roll is passed between the rollers 25 and 25', and is then fixed on the reel 23. Then the cover 26 is fixed on the plate 2 by means of the clamp 27, and water is caused to circulate through the frame 1.

When the equilibrium of temperature has been reached, the button 20 is depressed and the band B begins its travel in front of the member 12 and in consequence in front of the photo-multiplier 6, and the current of the multiplier device is recorded.

Any radio-active material which is soluble in a liquid can be measured by the method and the device according to the invention, since it is only necessary to impregnate a filter paper with it.

In all cases it is an advantage to add to the liquid scintillator a solution of high viscosity such as a solution of methyl poly-methacrylate, which prevents any movement of the radio-active product on the filter-paper, without appreciably reducing the emission of light by the scintillator.

What we claim is:

1. Apparatus for the continuous measurement of the radio-activity of radiation-emitting substances impregnated in a support constituted by a continuous band of inert absorbent material, said apparatus comprising in combination: a supporting frame; a housing formed in said frame; a photo-multiplier device mounted in said housing; a plate mounted on said frame and covering said housing; an orifice formed above said photo-multiplier; means for causing said band to travel longitudinally across said orifice; means for applying a liquid scintillator to said band during its travel; and cover means for excluding all ambient light from the active surface of said photo-multiplier.

2. Apparatus for the continuous measurement of the radioactivity of radiation-emitting substances impregnated in a support constituted by a continuous band of absorbent material, said apparatus comprising in combination: a hollow frame, means for circulating a cooling fluid through said frame; a housing formed in said frame; a photo-multiplier device mounted in said housing; a plate mounted on said frame and adapted to cover said housing; a slot of small width and a length at least equal to the width of said band, formed in said plate above said photo-multiplier; a member inserted in said slot, said member being of a material transparent to the wavelengths of the scintillations to be detected; an opaque shutter for closing said slot at will against light; reeling means for causing said band to travel against the upper face of said closure member; a receptacle intended to contain a liquid scintillator composition, said receptacle being provided at its lower portion with a plurality of fine orifices disposed substantially in line, so as to deliver said liquid to the band so as to soak said band with it, legs to hold said receptacle and resting on said plate in such a position that the said fine orifices are located above said slot and at a distance from it less than the length of a drop of said liquid passing out of said orifices; cover means for enclosing said reeling means, said receptacle and said legs; and light-tight means for sealing the joint between said plate and said cover means.

3. Apparatus for the continuous measurement of the radioactivity of radiation-emitting substances impregnated in a support constituted by a continuous band of absorbent material, said apparatus comprising in combination; a supporting frame, a housing formed in said frame, a photo-multiplier device mounted in said housing, a plate mounted on said frame and covering said housing; an orifice formed above said photo-multiplier; means for causing said band to travel longitudinally across said orifice; means for applying a liquid scintillator to said band during its travel on the upstream side of said orifice, and cover means for excluding all ambient light from the active surface of said photo-multiplier.

4. Apparatus for the continuous measurement of the radioactivity of radiation-emitting substances impregnated in a support constituted by a continuous band of absorbent material, said apparatus comprising in combination; a supporting frame, a housing formed in said frame, a photo-multiplier device mounted in said housing, a plate mounted on said frame and covering said housing, an orifice formed above said photo-multiplier, means for causing said band to travel longitudinally across said orifice, means for applying a liquid scintillator to said band during its travel at a point substantially level and on the upstream side of said orifice, and cover means for excluding all ambient light from the active surface of said photo-multiplier.

5. Apparatus for the continuous measurement of the radioactivity of radiation-emitting substances impregnated in a support constituted by a continuous band of absorbent material, said apparatus comprising in combination; a supporting frame, a housing formed in said frame, a photo-multiplier device mounted in said housing, a plate mounted on said frame and covering said housing; an orifice formed above said photo-multiplier, means for causing said band to travel longitudinally across said orifice, means for applying a liquid scintillator containing a viscous solution to said band during its travel, and cover means for excluding all ambient light from the active surface of the said photo-multiplier.

References Cited in the file of this patent

UNITED STATES PATENTS

| | | |
|---|---|---|
| 2,224,077 | Haupt et al. | Dec. 3, 1940 |
| 2,790,087 | Williams | Apr. 23, 1957 |
| 2,826,076 | Boretz et al. | Mar. 11, 1958 |

OTHER REFERENCES

Fluorescent Liquids Scintillation Counters, by Kallman et al., from Nucleonics, vol. 8, No. 3, March 1951, pages 32 to 39.

Monitor Measures Air and Surface Contamination, by Watts et al., from Nucleonics, vol. 13, No. 1, Jan. 1955, pages 51 and 52.

A Monitor for Low-Level Radioactivity in Liquid Streams, by Wingfield et al., DP-145, E. I. du Pont de Nemours & Co., Explosives Dept., Atomic Energy Div., Technical Div. Savannah River Laboratory, 14 pages.